April 25, 1950    J. A. BOROSKI    2,505,276
HARROW ATTACHMENT FOR TRACTOR WHEELS
Filed Nov. 8, 1948
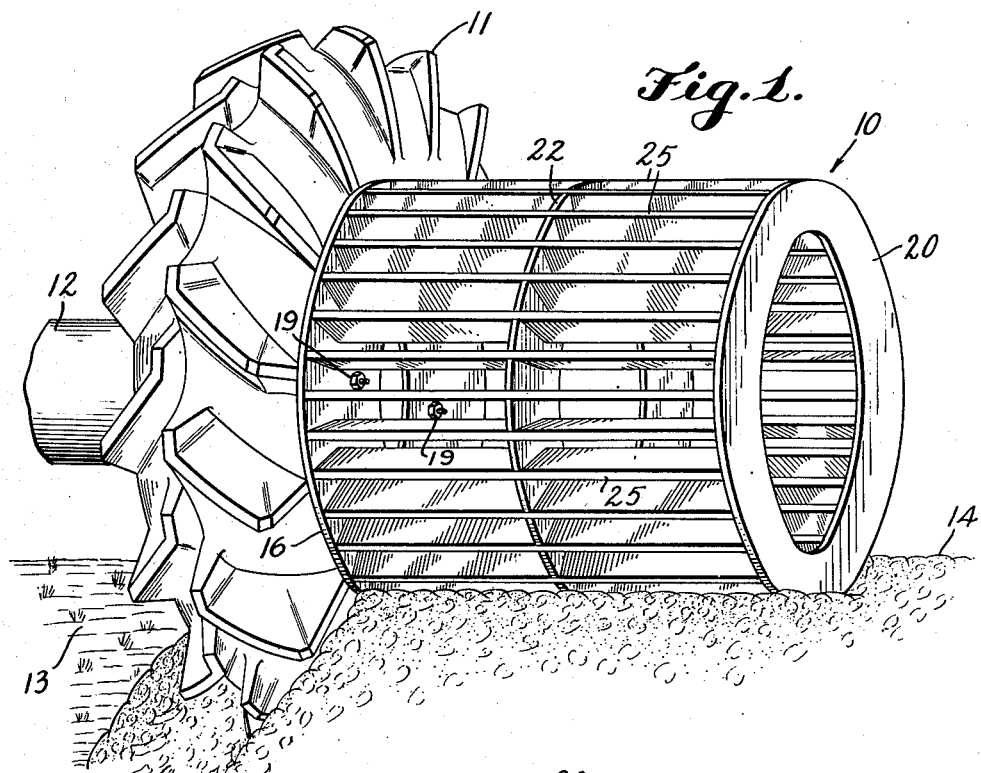
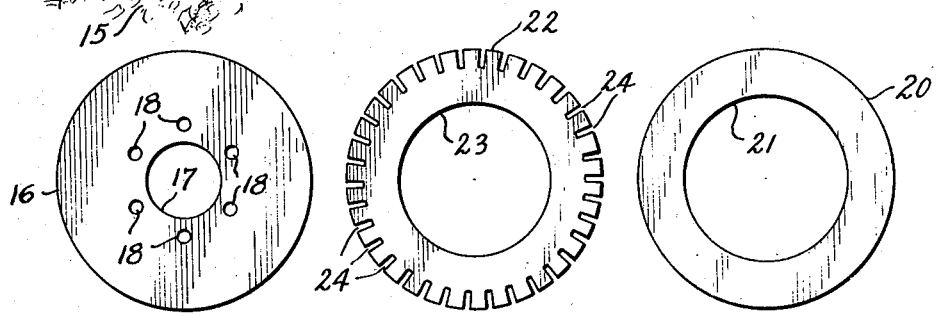
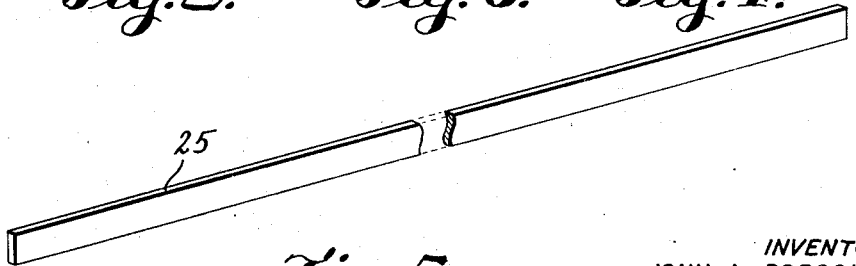
INVENTOR
JOHN A. BOROSKI.
BY Elton H. Brown, Jr.
AGENT Patented Apr. 25, 1950

2,505,276

UNITED STATES PATENT OFFICE 2,505,276

HARROW ATTACHMENT FOR TRACTOR WHEELS

John Adam Boroski, Rayland, Ohio

Application November 8, 1948, Serial No. 59,010

1 Claim. (Cl. 97—6)

The present invention relates to rolling harrows for converting plowed ground into seed beds.

One object of my invention is to provide a rolling harrow which may be attached to a wheel of a tractor.

Another object of my invention is to provide a rolling harrow attached to the wheel of a tractor whereby the plowing and harrowing operation may be conducted simultaneously.

A further object of my invention is to provide a rolling harrow which may be attached to the wheel of a tractor by one man without additional assistance.

A still further object of my invention is to provide a rolling harrow which is positive and simple in operation, and inexpensive to manufacure.

Other objects and advantages will become apparent upon reference to the annexed specification and the attached drawing, in which Figure 1 is a perspective view of my invention attached to a tractor wheel;

Figure 2 is a vertical elevation of the lug plate;

Figure 3 is a vertical elevation of the support ring;

Figure 4 is a vertical elevation of the end ring; and

Figure 5 is a perspective view of one of the harrow bars.

In the preparation of land for planting, the normal procedure is to plow the land, then harrow it by means of disc harrows, and then prepare the seed bed by means of toothed harrows. It is often necessary to have an additional operation of opening a furrow when the planting device is not adapted to open its own furrow. In the normal practice, each of these operations require a separate coverage of the field by the tractor with the particular implement attached to perform the operation desired. This, of course, means that often the tractor must make the round of the field four times before the seed or plants may be planted. In practically every instance in farm operation, at least two separate operations of the tractor must be made; first the plowing operation, and then the harrowing operation to properly prepare the seed bed.

Applicant, in considering these problems, has invented a device which will permit the plowing and harrowing operation to be combined without materially increasing the draw-bar pull on the tractor. It is, of course, conceivable that the normal harrows could be pulled by the tractor in position to follow the plowing operation so as to accomplish the plowing and harrowing operation simultaneously but, of course, this would greatly increase the draw-bar pull on the tractor and would, in most instances, require a much more powerful tractor.

Referring now to the drawings wherein like numerals indicate like parts throughout the several views, the reference numeral 10 indicates generally my invention attached to a rear tractor wheel 11. The tractor wheel 11 is shown attached to the rear axle 12 of a tractor (not shown). In Figure 1, the tractor wheel 11 is proceeding away from the viewer, the land indicated at 13 is land which has not been plowed and the land indicated at 14 is the plowed land. The tractor wheel 11 is riding a furrow 15 which was cut by plows (not shown) on the previous pass about the field.

Referring now to my invention 10 in detail, the reference numeral 16 indicates the lug plate which is constructed of steelplate having an opening 17 in the center thereof to permit the plate to be positioned over the hub of the tractor wheel 11 and is also provided with a series of holes 18 about the opening 17 which are adapted to fit over the lug bolts 19 of the tractor wheel 11. An end ring 20, also constructed of steelplate, is provided with a much larger central opening 21 than the opening 17 of the lug plate 16. A support ring 22 is constructed of steel plate with a large central opening 23, much the same as end ring 20. The support ring 22 is further provided with a multiplicity of radially extending notches 24 in the outer periphery of the ring 22. The notches 24 are equally spaced about the entire outer circumference of support ring 22.

A harrow bar 25 is comprised of a rather elongated steel stock of a substantially rectangular cross-section.

In the construction of my invention, a series of harrow bars 25 are welded or otherwise secured at one end to the lug plate 16 in position so that one of the narrow edges of the harrow bar 25 extends to the outer periphery of the lug plate 16. The central portion of each of the harrow bars 25 is positioned in one of the notches 24 of support ring 22 and are welded or otherwise secured thereto. The free ends of the harrow bars 25 are then welded or otherwise attached to the end ring 20 so that the outer edges of the bars 25 coincide with the outer peripheral edge of the end ring 20. It is to be understood, of course, that the lug plate 16 and the end ring 20 may be notched to receive the harrow bars 25, the same as support ring 22 is notched at 24, if such structure is found to be desirable.

In the use and operation of my invention, the normal lock nuts of a tractor wheel are removed and the device is lifted and positioned so that the lug bolts 19 extend through the openings 18 of the lug plate 16. The lock nuts are then replaced on the lug bolts 19 and the device is ready for use.

As the tractor wheel 11 travels along the furrow 15, the harrow bars 25 of my invention are pressed deeply into the plowed ground and all clods are crushed and broken and at the same time a certain amount of churning of the land takes place which creates and leaves a level, loose seed bed.

It should be noted that practically no additional power is needed to operate the tractor when my device is attached thereto as there is relatively little frictional pull created by the device. In addition to this advantage, it should be noted that my device will increase the tractive effort of the wheel 11 and, in so doing, will retard the tendency of the wheel 11 to spin should there be sufficient draw-bar load to cause the wheel 11 to spin without my device.

The ground at the base of the furrow is often moist and, when this is the case, does not provide a particularly good traction surface and in these cases, my device is particularly helpful.

The above described construction is the preferred embodiment of my invention, but it should be understood that minor changes may be resorted to without departing from the scope of the appended claim.

I claim:

In a rolling harrow attachment for the rear wheel of a tractor, a lug plate provided with holes to register with the lug bolts of the wheel of said tractor, said lug plate having a circular disk shape, an end ring arranged in spaced parallel relation with respect to said lug plate and being axially aligned therewith, said end ring being of circular shape and having a substantially large central opening to afford access to the lug bolts, a plurality of equidistantly spaced circumferentially disposed harrow bars of a substantially rectangular cross-section, said cross-section having one pair of sides substantially greater than the other pair, said harrow bars extending between said lug plate and said end ring and secured thereto, each of said harrow bars being arranged in parallel relation to the axis of the lug plate and end ring, with said longer sides perpendicular to the soil when said harrow bar is in its lowermost position, and a support ring interposed between said lug plate and said end ring, said support ring having radial notches along its outer periphery to receive the harrow bars, said harrow bars being seated in said notches, whereby said harrow bars are supported against radial, peripheral, and torsional bending.

JOHN ADAM BOROSKI.

REFERENCES CITED

The following references are of record in the file of this patent:

UNITED STATES PATENTS

| Number | Name | Date |
|---|---|---|
| 992,797 | Moreau | May 23, 1911 |
| 1,707,384 | Bixel | Apr. 2, 1929 |
| 1,760,882 | Morrow | June 3, 1930 |